(12) United States Patent
Iyengar et al.

(10) Patent No.: US 8,385,069 B2
(45) Date of Patent: Feb. 26, 2013

(54) LIQUID COOLANT CONDUIT SECURED IN AN UNUSED SOCKET FOR MEMORY MODULE COOLING

(75) Inventors: Madhusudan K. Iyengar, Woodstock, NY (US); Vinod Kamath, Raleigh, NC (US); Howard V. Mahaney, Jr., Cedar Park, TX (US); Mark E. Steinke, Durham, NC (US); Aparna Vallury, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 12/785,779

(22) Filed: May 24, 2010

(65) Prior Publication Data

US 2011/0286175 A1  Nov. 24, 2011

(51) Int. Cl.
*H05K 7/20* (2006.01)
(52) U.S. Cl. .............. 361/700; 361/679.47; 361/679.52; 361/679.53; 361/717; 165/80.4; 62/259.2
(58) Field of Classification Search .............. 361/679.31, 361/679.33, 679.46–679.54, 689, 696–704, 361/707, 709, 710, 715–722, 760–761
See application file for complete search history.

(56) References Cited

U.S. PATENT DOCUMENTS

| 5,587,880 | A | 12/1996 | Phillips et al. | |
|---|---|---|---|---|
| 6,421,240 | B1 * | 7/2002 | Patel | 361/699 |
| 7,023,701 | B2 * | 4/2006 | Stocken et al. | 361/704 |
| 7,312,987 | B1 | 12/2007 | Konshak | |
| 7,342,797 | B2 | 3/2008 | Kamath et al. | |
| 7,385,812 | B1 | 6/2008 | Konshak et al. | |
| 7,388,752 | B2 | 6/2008 | Chang et al. | |
| 7,480,147 | B2 | 1/2009 | Hoss et al. | |
| 7,551,440 | B2 | 6/2009 | Belady et al. | |
| 7,573,715 | B2 | 8/2009 | Mojaver et al. | |
| 7,933,125 | B2 * | 4/2011 | Wei et al. | 361/699 |
| 8,004,841 | B2 * | 8/2011 | Cipolla et al. | 361/699 |
| 8,027,162 | B2 * | 9/2011 | Campbell et al. | 361/699 |
| 2003/0193780 | A1 | 10/2003 | Morrow et al. | |
| 2006/0098409 | A1 * | 5/2006 | Cheon | 361/699 |

(Continued)

FOREIGN PATENT DOCUMENTS

JP  11-112179 A  4/1999

OTHER PUBLICATIONS

IPCOM000031696D: "Method of Cooling Single Memory DIMM in 2DIMM per Channel Configuration When One DIMM is Populated;" Author: IBM; Publication: IP.COM Online Technical Disclosure; Publication Date: Oct. 5, 2004.

*Primary Examiner* — Courtney Smith
(74) *Attorney, Agent, or Firm* — Cynthia G. Seal; Jeffrey L. Streets

(57) ABSTRACT

An apparatus for cooling a memory module installed in a computer system includes a liquid coolant conduit that is connected to a conduit support structure having a form factor selectively securable within a first preconfigured memory module socket of the computer system in order to position the liquid coolant conduit above the first socket. A heat pipe provides direct thermal contact between the liquid conduit and a heat spreader assembly in direct thermal contact with a face of the memory module. The apparatus may include a second heat pipe and second heat spreader assembly for similarly cooling a second memory module. In alternative configurations, the apparatus may cool memory modules on opposing sides of the conduit or memory modules that are both on the same side of the conduit.

16 Claims, 6 Drawing Sheets

U.S. PATENT DOCUMENTS

| | | |
|---|---|---|
| 2008/0062652 A1* | 3/2008 | Lieberman et al. ........... 361/715 |
| 2008/0084667 A1* | 4/2008 | Campbell et al. ............. 361/702 |
| 2009/0080151 A1* | 3/2009 | Kalms et al. ............. 361/679.52 |
| 2009/0190303 A1* | 7/2009 | Chu et al. ................. 361/679.47 |
| 2009/0237883 A1* | 9/2009 | Wei et al. ...................... 361/699 |
| 2010/0252234 A1* | 10/2010 | Cambell et al. .............. 165/80.2 |

\* cited by examiner

LIQUID COOLANT CONDUIT SECURED IN AN UNUSED SOCKET FOR MEMORY MODULE COOLING

BACKGROUND

1. Field of the Invention

The present invention relates to liquid cooling of memory modules installed in a computer system.

2. Background of the Related Art

Computer systems are being designed and built with an ever increasing number of heat generating components. Given the limited footprint of most computing systems, a continuous increase in the number of heat generating components creates challenging heat dissipation issues. If not dealt with adequately, the increasing amount of heat can harm the structural and data integrity of the computer system, making the effect felt both at a system and component level.

Most electronic packages or nodes in large computer environments are housed in a chassis that is disposed in a rack. Traditionally, these nodes have been cooled by forced air cooling using air moving devices, such as fans and blowers, selectively disposed somewhere in the environment as to allow optimum air flow. These air moving devices are often designed to displace hot air away from the components by creating parallel air flow paths that circulate through the chassis and rack. Air moving systems may take the form of a computer room air conditioning (CRAC) system, a chassis fan system, or fans in an individual node or group of nodes.

As the density of heat generating components increases, air cooling solutions are becoming more prohibitive and costly. In recent years, attention has been directed to cooling high heat flux microprocessor modules. However, with an increase in bandwidth and server throughput, large amounts of on-board memory are also required to achieve increased performance. In order to provide this increase in the amount of memory in servers, computer systems have experienced an increase in the number of standard memory packages, such as dual in-line memory modules (hereinafter DIMMs). In addition, each memory package often has increasing power consumption, increasing heat generation and tighter DIMM row spacing associated with it. Memory modules can contribute as much as 50% of the total server heat load. If the maximum DIMM temperature dictated by reliability is unchanged, then traditional air cooled servers will require greater airflow in order to achieve increased heat removal.

In recent years, direct or indirect liquid cooling has become a more attractive option for the designers of computing systems. Liquid cooled structures have been shown, in some circumstances such as large data centers, to consume less energy. The systems currently in use, however, whether air cooled or water cooled, provide limited options and may not be suitable to adequately cool future generations of computer systems or subsystems, especially when it comes to cooling memory packages such as DIMMs. It can be difficult to allocate sufficient space with a computer server for the additional equipment that is necessary to provide liquid cooling, such as inlet and outlet pipes, conduits, cold plates and the like.

BRIEF SUMMARY

One embodiment of the present invention provides an apparatus for cooling a memory module installed in a computer system. The apparatus comprises a liquid coolant conduit adapted for circulating a liquid coolant between an liquid inlet end and a liquid outlet end, and a conduit support structure secured to the liquid coolant conduit, wherein the conduit support structure has a form factor selectively securable within a first preconfigured memory module socket of the computer system to position the liquid coolant conduit above the first socket. The apparatus further comprises a first heat pipe having a first portion in direct thermal contact with the liquid conduit, wherein the first heat pipe extends laterally from the liquid coolant conduit to dispose a second portion of the first heat pipe adjacent a second preconfigured memory module socket, and a first heat spreader assembly in direct thermal contact with the second portion of the first heat pipe, wherein the first heat spreader assembly includes a first thermally conductive plate disposed for direct thermal contact with a first face of a first memory module installed in the second preconfigured memory module socket.

DETAILED DESCRIPTION

Figure 1A:
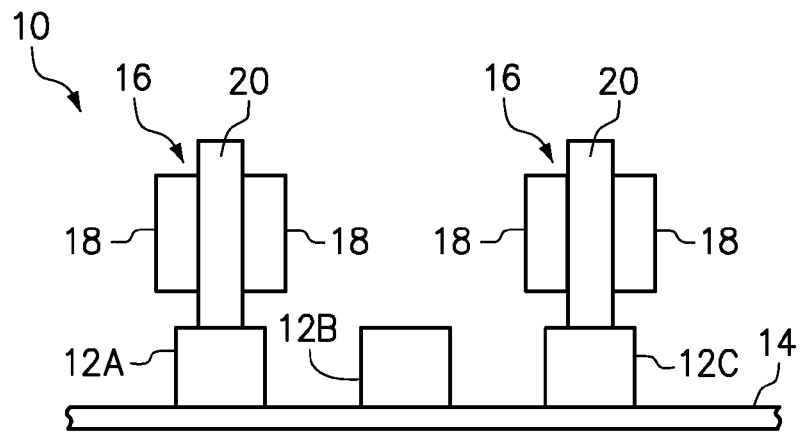
FIGS. 1A and 1B are end and top views of preconfigured memory module sockets on a motherboard receiving two memory modules.

One embodiment of the present invention provides an apparatus for cooling a memory module installed in a computer system. The apparatus comprises a liquid coolant conduit adapted for circulating a liquid coolant between an liquid inlet end and a liquid outlet end, and a conduit support structure secured to the liquid coolant conduit, wherein the conduit support structure has a form factor selectively securable within a first preconfigured memory module socket of the computer system to position the liquid coolant conduit above the first socket. The apparatus further comprises a first heat pipe having a first portion in direct thermal contact with the liquid conduit, wherein the first heat pipe extends laterally from the liquid coolant conduit to dispose a second portion of the first heat pipe adjacent a second preconfigured memory module socket, and a first heat spreader assembly in direct thermal contact with the second portion of the first heat pipe, wherein the first heat spreader assembly includes a first thermally conductive plate disposed for direct thermal contact with a first face of a first memory module installed in the second preconfigured memory module socket.

According to another embodiment of the apparatus, the conduit support structure includes a plurality of electrical contacts for electronic communication with the first preconfigured memory module socket and circuitry to reduce signal reflections. The conduit support structure may, therefore, serve the functions of a terminator card in addition to its function of supporting and positioning the conduit.

In yet another embodiment, the liquid conduit does not extend above the height of the first and second memory modules when installed in the second and third preconfigured memory module sockets. Many server chassis, for example, are designed with very little clearance between the installed memory modules and other components or a chassis wall. By limiting the height of the liquid conduit to the height of the installed memory modules, the liquid conduit will not interfere with other components or the chassis wall. In a related embodiment, the first and second heat pipes also do not extend above the height of the first and second memory modules when installed in the second and third preconfigured memory module sockets. Optionally, the entire cooling apparatus does not extend above the memory modules.

Although any suitable coolant liquid may be used, a preferred liquid coolant is water. The coolant may be chilled before being supplied to the liquid coolant conduit, but the temperature of the chilled coolant should not be less than the dew point of the air in the vicinity of the computer system to prevent water vapor from condensing on the conduit. Optionally, the coolant may be unchilled and provided to the conduit inlet at an ambient temperature. The use of unchilled coolant will eliminate the cost of chilling and reduce the potential for condensation on the conduit. Whether or not the coolant is chilled, a liquid inlet end of the liquid coolant conduit is preferably in fluid communication with a liquid coolant source that is external to the computer system. The external liquid coolant source should provide the motive force for circulating the coolant and, if the coolant source forms a closed loop, attend to removal of heat from the coolant before returning to the computer system.

The liquid coolant conduit may having any cross-sectional shape and need not be the same along the entire length of the conduit. However, a square cross-sectional shape may, in the space available above a socket, facilitate the most fluid capacity and/or facilitate contact with a heat pipe. Round conduits are another suitable choice.

In a further embodiment, any of the heat spreader assemblies of the present invention may further include a second thermally conductive plate disposed for direct thermal contact with a second face of the first memory module, and wherein the first and second faces of the first memory module are on opposing sides of the first memory module. Typically, the first and second thermally conductive plates will be parallel in order to make full and direct thermal contact with the first and second faces of the memory module. However, the plates may also be hinged or flexible form manually separated to an open position for receiving a memory module and return to a parallel position for direct thermal contact with the memory module.

A dual in-line memory module (DIMM) is a common type of memory module, including a series of dynamic random access memory (DRAM) integrated circuit modules mounted on a printed circuit board (PCB) having a defined form factor. Although individual DRAM modules are spaced apart on the printed circuit board of the DIMM, each DRAM has a flat, outwardly facing surface that lies in a common plane such that a single thermally conductive plate of the heat spreader can make direct thermal contact with each DRAM on one side of the printed circuit board.

Any of the heat spreader assemblies may further include one or more brackets secured between the first and second thermally conductive plates of the first heat spreader assembly. Such brackets may server to physically reinforce the heat spreader assemblies and/or improve the transfer of heat from the memory modules to a heat pipe. Furthermore, a bracket may selectively engage one or more of the thermally conductive plates, where the bracket may release the plate for installation about a memory module and latch the plate in direct thermal contact with the memory module for the purpose of cooling.

Another embodiment of the apparatus includes a second heat pipe and a second heat spreader assembly for cooling a second memory module. For example, the apparatus may comprise a second heat pipe having a first portion in direct thermal contact with the liquid conduit, wherein the second heat pipe extends laterally from the liquid conduit to dispose a second portion of the second heat pipe adjacent a third preconfigured memory module socket. A second heat spreader assembly is then positioned in direct thermal contact with the second portion of the second heat pipe, wherein the second heat spreader assembly includes a first thermally conductive plate disposed for direct thermal contact with a first face of a second memory module installed in the third preconfigured memory module socket.

In a further embodiment of the cooling apparatus, the first and second heat pipes extend in opposing lateral directions away from the liquid coolant conduit, wherein the second and third preconfigured memory module sockets are located on opposing lateral sides of the liquid coolant conduit, and wherein the first and second heat spreader assemblies are disposed for cooling first and second memory modules installed in the second and third preconfigured memory module sockets. This embodiment is useful in computer system configurations having a vacant or unused memory module socket between two memory modules. An advantage of this embodiment is that one liquid coolant conduit can cool multiple memory modules, such as two DIMM cards, without necessarily extending above the memory modules themselves.

In yet another embodiment of the cooling apparatus, the first and second heat pipes extend in the same lateral direction away from the liquid coolant conduit. Accordingly, the liquid coolant conduit may be supported in a first socket for cooling both a first memory module in a second socket and a second memory module in a third socket on an opposing lateral side of the second socket from the liquid coolant conduit. The first and second heat spreader assemblies are disposed for cooling first and second memory modules installed in the second and third preconfigured memory module sockets. In an optional aspect of this embodiment, the second heat pipe extends over the top of the first heat spreader assembly without contacting the first heat spreader assembly.

In a still further embodiment, the first portion of the first heat pipe extends longitudinally along the liquid coolant conduit for direct thermal contact with the liquid coolant conduit over a major portion of the length of first preconfigured memory module socket. Increasing the interfacial area of direct thermal contact between the heat pipe and the thermally conductive liquid coolant conduit will improve heat transfer into the liquid. The spacing of the preconfigured memory module sockets, as well as the width of the memory modules and liquid conduit, will affect whether or not any specific computer system has enough room to extend the heat pipe along the conduit. Also, embodiments having first and second heat pipes will have to share the available surface area of the liquid coolant conduit.

Various embodiments of the invention provide a liquid cooling system that may be installed as an after-market product or retrofit, such that a planar may be used with air cooling alone or with liquid cooling. In such embodiments, the components of the liquid cooling system preferably fit in existing spaces within the planar without taking up space on the planar that is needed for other components. For example, the liquid cooling system may be installed in one or more servers installed within a rack, while one or more other servers within the same rack are solely air cooled.

Computer systems are sometimes used in a cluster type environment where it is desirable to use DIMM that operate at the fastest speeds available. In some of these systems, this may mean that not all of the possible memory module sockets will be populated. For example, it is common to have a motherboard with three available sockets where only one or two of those sockets have an installed DIMM. Even if one socket is populated with a terminator card, there is likely to be an unpopulated memory module socket that can be used to receive and support a liquid coolant conduit.

Figure 1B:
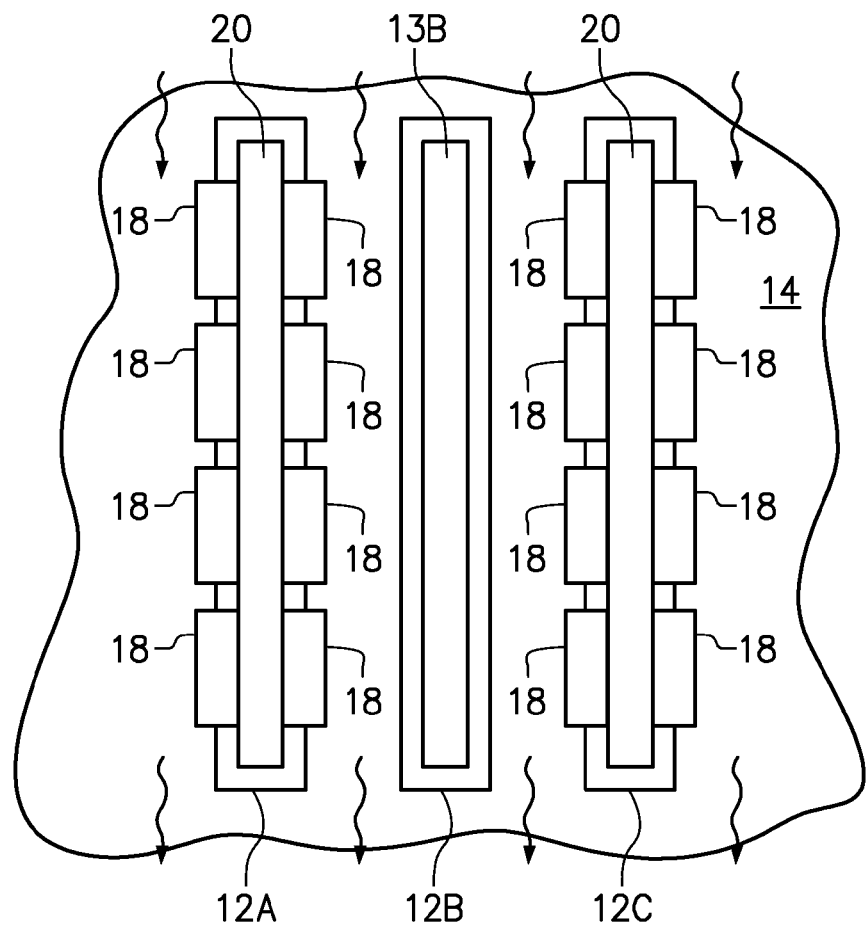

FIGS. 1A and 1B are end and top views of a prior art computer system 10 having three preconfigured memory module sockets 12A-C on a motherboard 14 and two memory modules 16 installed in the sockets. Each memory module 16 includes a series of integrated circuit (IC) modules 18 on either side of a printed circuit board 20. Configurations and form factors of a standard memory module, such as a dual in-line memory module (DIMM), are well-known. As shown, the socket 12B is unpopulated. Referring specifically to FIG. 1B, the unpopulated socket 12B is shown having a socket opening 13B that is configured for receiving, securing and communicating with a standard memory module.

Figure 2A:
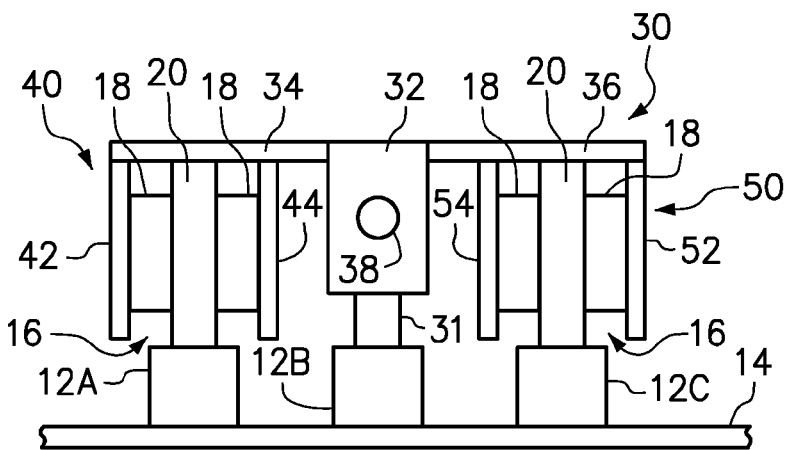
FIGS. 2A and 2B are end and top views of preconfigured memory module sockets on a motherboard receiving two memory modules and a first embodiment of an apparatus for cooling the memory modules.
Figure 2B:
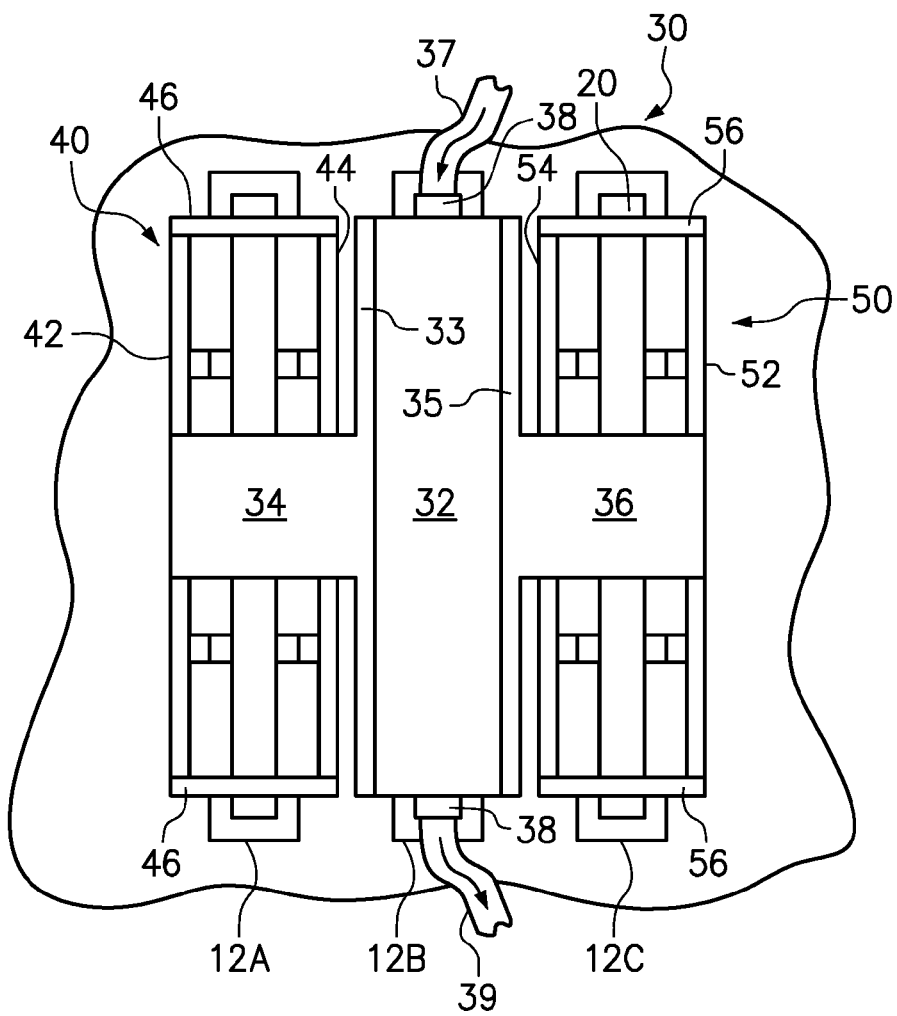

FIGS. 2A and 2B are end and top views of three preconfigured memory module sockets 12A-C on a motherboard 14 receiving two memory modules 16 and a first embodiment of an apparatus 30 for cooling the memory modules. The apparatus 30 includes a liquid coolant conduit 32 positioned above the middle socket 12B by a support structure 31. The support structure 31 has a form factor for being selectively secured in the socket 12B. Optionally, the form factor is the same as that of a standard memory module 16.

The apparatus 30 also includes a first heat pipe 34 extending in a first lateral direction from the conduit 32, and a second heat pipe 36 extending in a second lateral direction (opposite the first lateral direction) from the conduit 32. Optionally, the first and second heat pipes 34, 36 may form a single heat pipe having a first section 34 and a second section 36. As shown, the first and second heat pipes 34, 36 are in direct thermal contact with first and second heat spreader assemblies 40, 50, respectively, that draw heat from one of the memory modules 16. Specifically, the heat spreader assemblies 40, 50 each include a pair of thermally conductive plates 42, 44, 52, 54 that are in direct thermal contact with a heat pipe 34, 36 and also in direct thermal contact with a face of a memory module 16. A first pair of the plates 42, 44 draw heat from the outwardly directed faces of the IC modules 18 of one memory module 16 and a second pair of the plates 52, 54 draw heat from the outwardly directed faces of the IC modules 18 of the other memory module 16.

It should be noted that the top edge of the liquid coolant conduit 32, as well as the heat pipes 34, 36, extend above the highest point of the memory modules 16 (which is the distal end of the printed circuit board 20). Accordingly, the cooling apparatus 30 would only be used in computer system chassis where there is some available space above the memory modules. Also shown in FIG. 2A is a coupling 38 in one end of the conduit 32 for securing the end of a coolant inlet (supply) or coolant outlet (discharge) tube.

Referring specification to FIG. 2B, a pair of couplings 38, one at each end of the liquid coolant conduit 32, are used to connect a coolant inlet tube 37 and a coolant outlet tube 39. The heat pipes 34, 36 extend over the respective memory modules 16 and make direct thermal contact with the pair of thermally conductive plates (plates 42, 44 in the first heat spreader 40 and plates 52, 54 in the second heat spreader 50). A first portion 33, 35 of each heat pipe 34, 36, respectively, extends along the liquid coolant conduit 32 over substantially the entire length of the conduit 32 in order to increase heat transfer from the heat pipes to the liquid coolant within the conduit. Other configurations for providing contact between the heat pipes and the conduit will become apparent to one having ordinary skill in the art and are included within the scope of the present invention.

A bracket 46 is included at each end of the first heat spreader assembly 40 to extend between, and reinforce, the thermally conductive plates 42, 44. Similarly, a bracket 56 is included at each end of the second heat spreader assembly 50 to extend between, and reinforce, the thermally conductive plates 52, 54. Each bracket 46, 56 is preferably made from a thermally conductive material, and is most preferably the same material as the thermally conductive plates 42, 44, 52, 54. Optionally, the brackets 46 may be selectively secured so that one or more of the plates 42, 44, 52, 54 may be flexed away from a memory module 16 to a first position to receive the memory module 16, then secured by the bracket 46 in a second position where the plates 42, 44, 52, 54 are in direct thermal contact with the memory module 16.

Figure 3A:
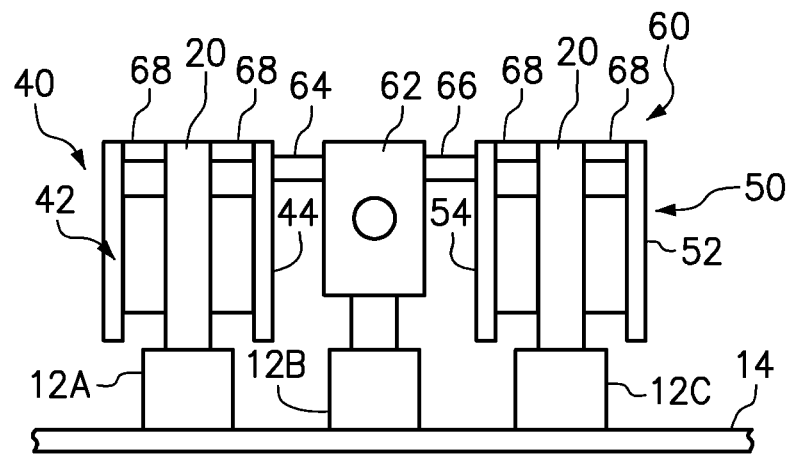
FIGS. 3A and 3B are end and top views of preconfigured memory module sockets on a motherboard receiving two memory modules and a second embodiment of an apparatus for cooling the memory modules.
Figure 3B:
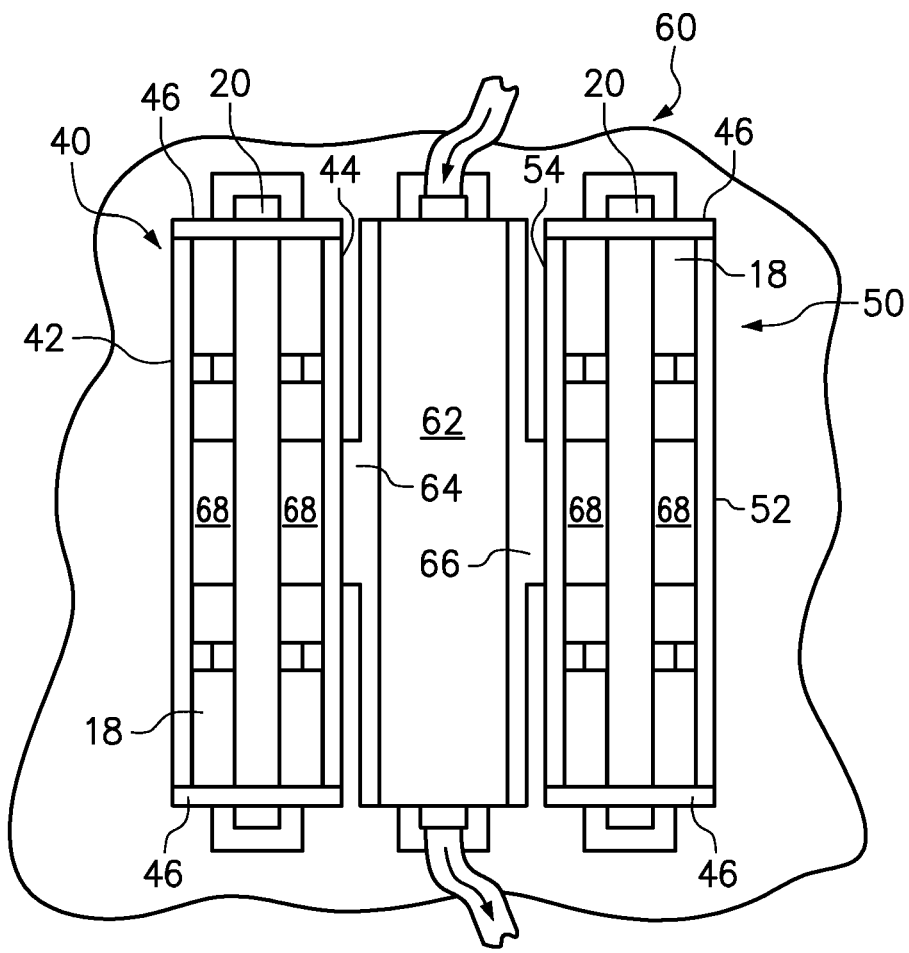

FIGS. 3A and 3B are end and top views of preconfigured memory modules sockets 12A-C on a motherboard 14 receiving two memory modules 16 and a second embodiment of an apparatus 60 for cooling the memory modules. The cooling apparatus 60 of FIGS. 3A and 3B is similar to the cooling apparatus 30 of FIGS. 2A and 2B except that the apparatus 60 does not extend above the top of the memory modules 16. This distinction is accomplished because the cooling liquid conduit 62 is shorter (or lower toward the socket 12B) and the heat pipes 64, 66 extend only to the closest plate 44, 54 rather than extending over the top of the memory modules 16. Optionally, the thermally conductive plates 42, 44 of the first heat spreader assembly 40 and/or the thermally conductive plates 52, 54 of the second heat spreader assembly 50 may be reinforced with bracing members 68 that abut opposing sides of the printed circuit boards 20.

Each heat spreader assembly 40, 50 may further include an end bracket or clip at each end of the thermally conductive plates (plates 42, 44 of the first heat spreader assembly 40 and the thermally conductive plates 52, 54 of the second heat spreader assembly 50). Such end brackets or clips have been omitted from FIG. 3A, but four brackets 46 are shown in FIG. 3B. The bracket 46 may serve a first function of providing a thermally conductive pathway between the two thermally conductive plates in a heat spreader assembly, and/or a second function of biasing the plates against the outwardly facing surfaces of the integrated circuit modules 18 of either memory module.

In reference specifically to FIG. 3B, the heat pipes 64, 66 are shown to terminate at the closest adjacent sides of the heat spreaders 40, 50. It should be noted that the brackets 46 disposed between the ends of the plates provide a pathway for the transfer of heat from the outer plates 42, 52 to the inner plates 44, 54 and then to the heat pipes 64, 66.

Figure 4A:
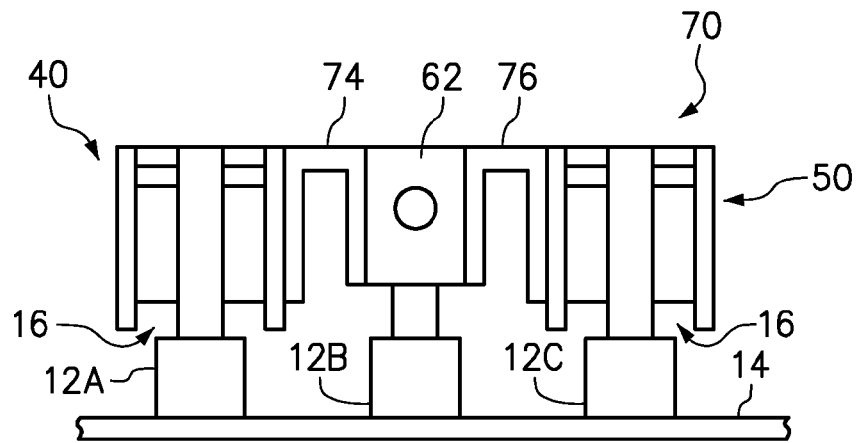
FIGS. 4A and 4B are end and top views of preconfigured memory module sockets on a motherboard receiving two memory modules and a third embodiment of an apparatus for cooling the memory modules.
Figure 4B:
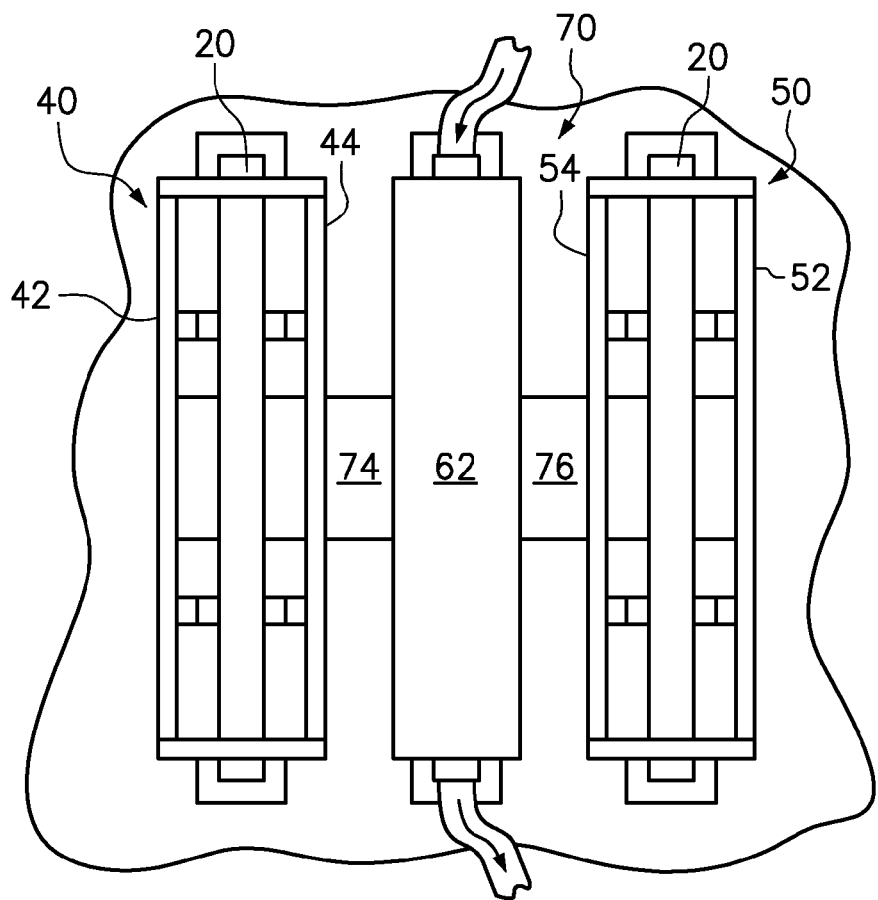

FIGS. 4A and 4B are end and top views of preconfigured memory modules sockets 12A-C on a motherboard 14 receiving two memory modules 16 and a third embodiment of an apparatus 70 for cooling the memory modules. The cooling apparatus 70 of FIGS. 4A and 4B is similar to the cooling apparatus 60 of FIGS. 3A and 3B except that the spacing between the sockets 12A, 12B, 12C is sufficiently wide such that the heat pipes 74, 76 are doubled over to extend downwardly along the liquid coolant conduit 62 as well as downwardly along each of the heat spreaders 40, 50 to provide additional surface area for direct thermal contact and heat exchange there between. This embodiment also does not need to extend above the memory modules 16.

Figure 5A:
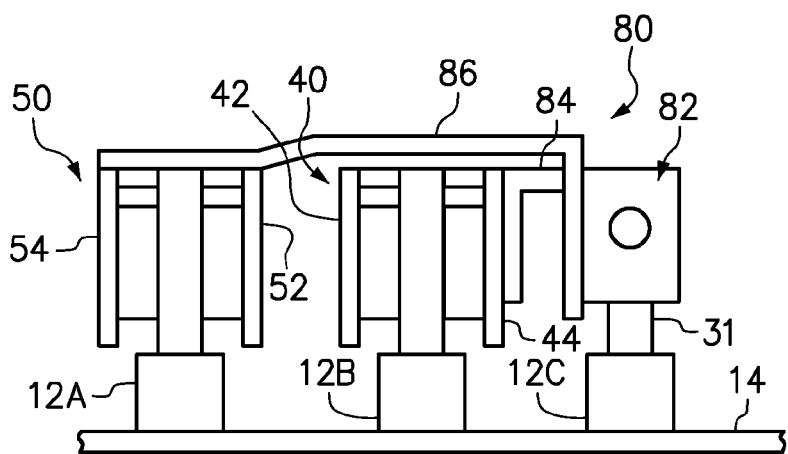
FIGS. 5A and 5B are end and top views of preconfigured memory module sockets on a motherboard receiving two memory modules and a fourth embodiment of an apparatus for cooling the memory modules.
Figure 5B:
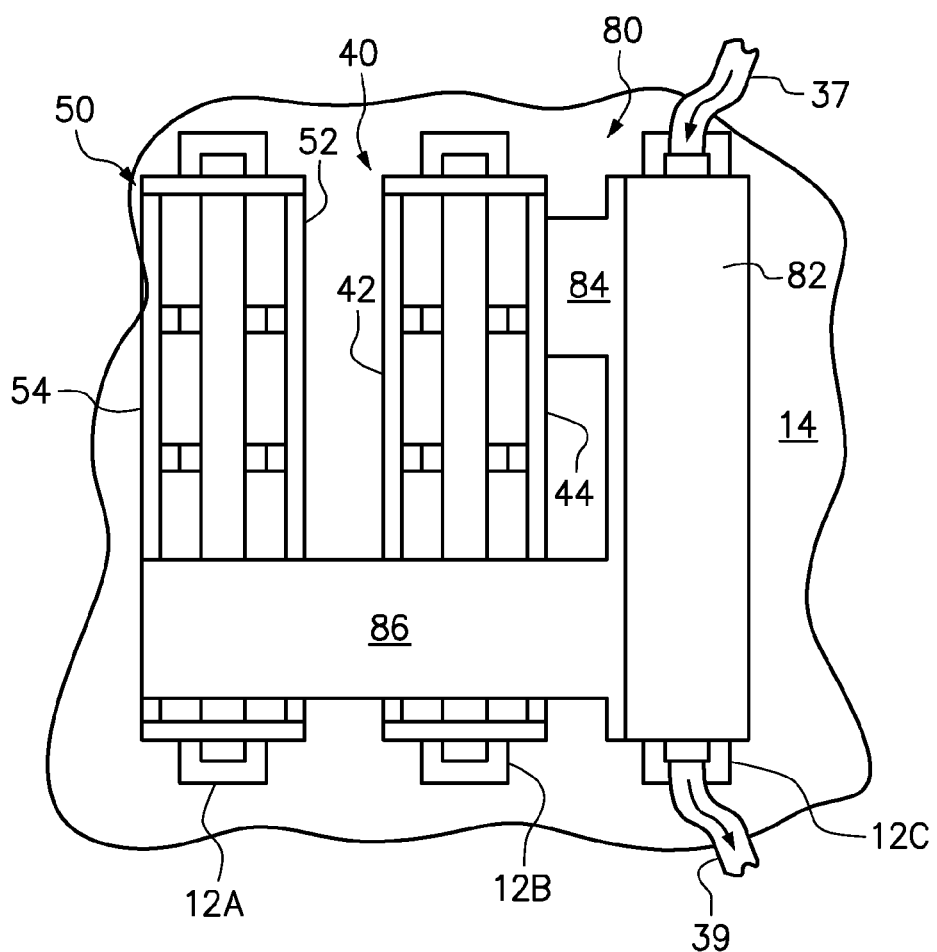

FIGS. 5A and 5B are end and top views of preconfigured memory modules sockets 12A-C on a motherboard 14 receiving two memory modules 16 and a fourth embodiment of an apparatus 80 for cooling the memory modules. The cooling apparatus 80 of FIGS. 5A and 5B differs from the various apparatus 30, 60, 70 because the memory modules 16 are installed in adjacent sockets 12A, 12B and the liquid conduit 82 is secured by the support structure 31 in the far right socket 12C. Accordingly, first and second heat pipes 84, 86 include a first portion in direct thermal contact with the same side of the liquid coolant conduit 82 and both heat pipes extend in the same lateral direction. The first heat pipe 84 extends into direct thermal contact with the first heat spreader assembly 40 and the second heat pipe 86 extends into direct thermal contact with the second heat spreader assembly 50. Although the heat pipes 84, 86 may establish direct thermal contact according to any of the embodiments described herein, the first heat pipe 84 is shown extending downwardly in contact with the thermally conductive plate 44 in the same manner as heat pipe 74 in FIG. 4A and the second heat pipe 86 is shown extending into contact with both thermally conductive plates 52, 54 in the same manner as heat pipe 34 contact the plates 42, 44 in FIG. 2A. Other types and combinations of configurations for direct thermal contact may similarly be used.

Figure 6A:
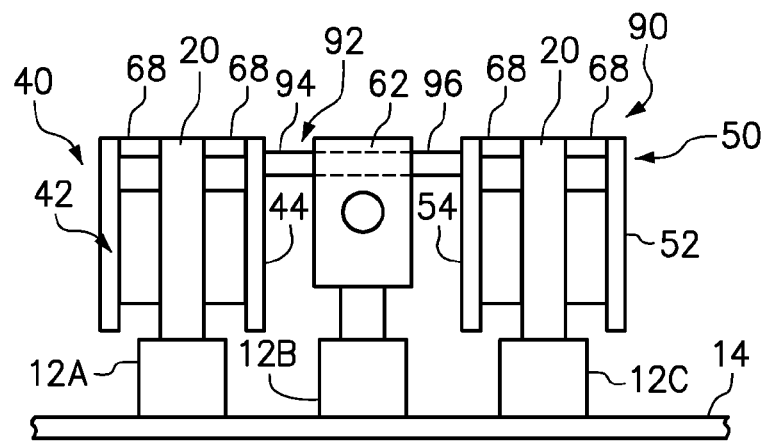
FIGS. 6A and 6B are end and top views of preconfigured memory module sockets on a motherboard receiving two memory modules and a fifth embodiment of an apparatus for cooling the memory modules.
Figure 6B:
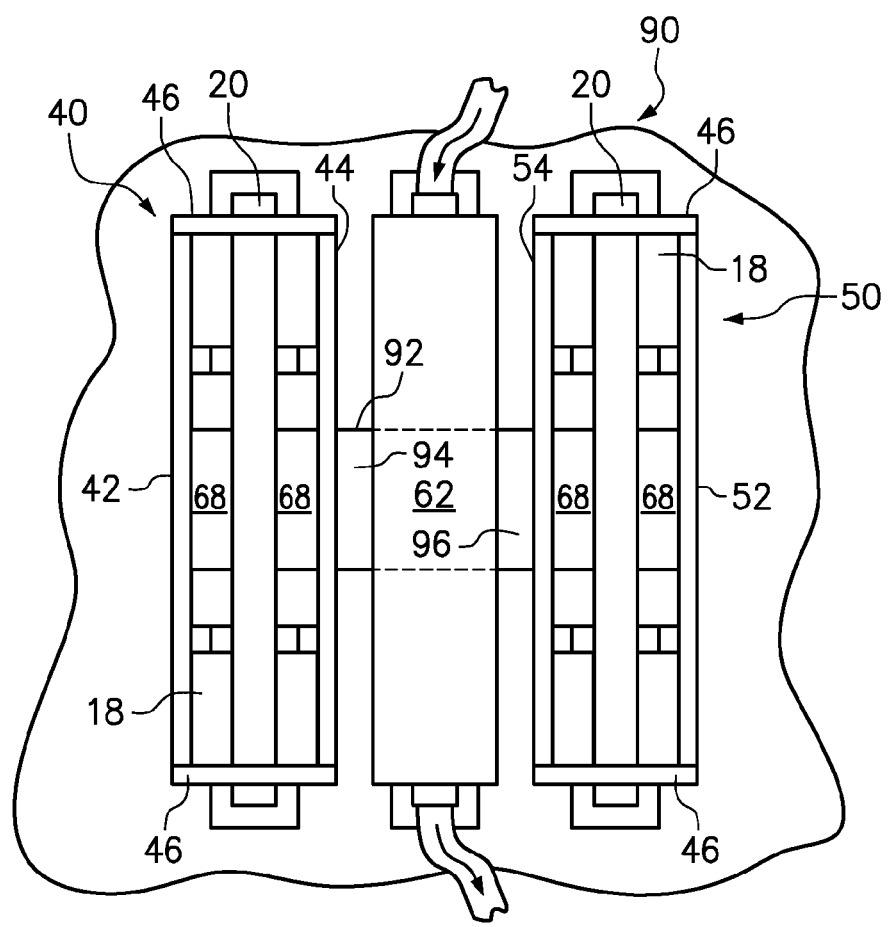

FIGS. 6A and 6B are end and top views of preconfigured memory modules sockets 12A-C on a motherboard 14 receiving two memory modules 16 and a fifth embodiment of an apparatus 90 for cooling the memory modules. The cooling apparatus 80 of FIGS. 6A and 6B differs from the apparatus 60 of FIGS. 3A and 3B in that the heat pipe 92 is received into the liquid coolant conduit 62. As shown, the heat pipe 92 extends through the conduit 62 and is preferably cooled on all sides by the liquid coolant flowing in the conduit 62. The heat pipe 92 further includes a first end 94 extending from the conduit to the first heat spreader assembly 40 and a second end 96 extending from the conduit to the second heat spreader assembly 50. During assembly, opposing holes may be drilled or cut into the sides of the conduit to receive the heat pipe. The heat pipe may then be sealed in place, for example using welding, gaskets or plastics.

It should be understood that a heat pipe is made with a thermally conductive material, such as metal, and contains its own internal fluid to transfer heat within the heat pipe chamber through phase transitions (i.e., evaporation at hot surfaces and condensation at cool surfaces). Accordingly, there is no fluid communication between the heat pipe and the liquid conduit. Rather, heat is conductively transferred from the outer surface of the heat pipe to the liquid conduit.

The thermally conductive plates, brackets, conduit and the like preferably include a metal, such as copper or aluminum, but may also include other materials for direct thermal contact with a memory module. In a further option, thermally conductive and elastically compressive thermal interface pads may be disposed between the heat spreader plates and the memory modules to provide a degree of dimensional tolerance. Suitable materials for the thermal interface pad include, for example, T-PUTTY (available from Laird Technologies, Inc.), TP-2100 thermal pad (available from Dow Corning Corporation of Midland, Mich.), and SIL-PAD 900S (available from The Bergquist Company of Chanhassen, Minn.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus for cooling a memory module installed in a computer system comprising:
    a liquid coolant conduit adapted for circulating a liquid coolant between an liquid inlet end and a liquid outlet end;
    a conduit support structure secured to the liquid coolant conduit, wherein the conduit support structure has a form factor selectively securable within a first preconfigured memory module socket of the computer system to position the liquid coolant conduit above the first socket;
    a first heat pipe having a first portion in direct thermal contact with the liquid conduit, wherein the first heat pipe extends laterally from the liquid coolant conduit to dispose a second portion of the first heat pipe adjacent a second preconfigured memory module socket; and
    a first heat spreader assembly in direct thermal contact with the second portion of the first heat pipe, wherein the first heat spreader assembly includes a first thermally conductive plate disposed for direct thermal contact with a first face of a first memory module installed in the second preconfigured memory module socket.

2. The apparatus of claim 1, wherein the first heat spreader assembly further includes a second thermally conductive plate disposed for direct thermal contact with a second face of the first memory module, and wherein the first and second faces of the first memory module are on opposing sides of the first memory module.

3. The apparatus of claim 1, further comprising:
    a second heat pipe having a first portion in direct thermal contact with the liquid conduit, wherein the second heat pipe extends laterally from the liquid conduit to dispose a second portion of the second heat pipe adjacent a third preconfigured memory module socket; and a second heat spreader assembly in direct thermal contact with the second portion of the second heat pipe, wherein the second heat spreader assembly includes a first thermally conductive plate disposed for direct thermal contact with a first face of a second memory module installed in the third preconfigured memory module socket.

4. The apparatus of claim 1, wherein the second heat spreader assembly further includes a second thermally conductive plate disposed for direct thermal contact with a second face of the second memory module, and wherein the first and second faces of the second memory module are on opposing sides of the second memory module.

5. The apparatus of claim 4, wherein the first heat spreader assembly further includes a second thermally conductive plate disposed for direct thermal contact with a second face of the first memory module, and wherein the first and second faces of the first memory module are on opposing sides of the first memory module.

6. The apparatus of claim 3, wherein the first and second heat pipes extend in opposing lateral directions away from the liquid coolant conduit, wherein the second and third preconfigured memory module sockets are located on opposing lateral sides of the liquid coolant conduit, and wherein the first and second heat spreader assemblies are disposed for cooling first and second memory modules installed in the second and third preconfigured memory module sockets.

7. The apparatus of claim 6, wherein the first portion of the first heat pipe extends longitudinally along the liquid coolant conduit for direct thermal contact with the liquid coolant conduit over a major portion of the length of first preconfigured memory module socket.

8. The apparatus of claim 3, wherein the first and second heat pipes extend in the same lateral direction away from the liquid coolant conduit, wherein the third preconfigured memory module socket is located on an opposing lateral side of the second preconfigured memory module socket from the liquid coolant conduit, and wherein the first and second heat spreader assemblies are disposed for cooling first and second memory modules installed in the second and third preconfigured memory module sockets.

9. The apparatus of claim 8, wherein the second heat pipe extends over the top of the first heat spreader assembly without contacting the first heat spreader assembly.

10. The apparatus of claim 1, wherein the conduit support structure includes a plurality of contacts for electronic communication with the first preconfigured memory module socket and circuitry to reduce signal reflections.

11. The apparatus of claim 1, wherein the liquid conduit does not extend above the height of the first and second memory modules when installed in the second and third preconfigured memory module sockets.

12. The apparatus of claim 6, wherein the first and second heat pipes do not extend above the height of the first and second memory modules when installed in the second and third preconfigured memory module sockets.

13. The apparatus of claim 1, wherein the liquid coolant is water.

14. The apparatus of claim 1, wherein the liquid coolant is a refrigerant.

15. The apparatus of claim 1, wherein the liquid inlet end of the liquid coolant conduit is in fluid communication with a liquid coolant source that is external to the computer system.

16. The apparatus of claim 1, wherein the first heat spreader assembly further includes one or more brackets secured between the first and second thermally conductive plates of the first heat spreader assembly, and wherein the second heat spreader assembly further includes one or more brackets secured between the first and second thermally conductive plates of the second heat spreader assembly.

* * * * *